(12) United States Patent
Lavi et al.

(10) Patent No.: US 11,500,108 B2
(45) Date of Patent: Nov. 15, 2022

(54) SYSTEM AND METHOD FOR NAVIGATION WITH LIMITED SATELLITE COVERAGE AREA

(71) Applicant: Tupaia Ltd., Ramat-Hasharon (IL)

(72) Inventors: Nadav Lavi, Ramat-Hasharon (IL); Kobi Scheim, Pardess-Hanna (IL); Zohar Zisapel, Tel-Aviv (IL)

(73) Assignee: Tupaia Ltd., Ramat-Hasharon (IL)

( * ) Notice: Subject to any disclaimer, the term of this patent is extended or adjusted under 35 U.S.C. 154(b) by 108 days.

(21) Appl. No.: 17/083,944

(22) Filed: Oct. 29, 2020

(65) Prior Publication Data

US 2022/0137231 A1     May 5, 2022

(51) Int. Cl.
*G01S 19/11*     (2010.01)
*G01S 19/48*     (2010.01)
*G01S 19/51*     (2010.01)

(52) U.S. Cl.
CPC ............. *G01S 19/11* (2013.01); *G01S 19/48* (2013.01)

(58) Field of Classification Search
CPC .......... G01S 19/11; G01S 19/48; G01S 19/51
USPC ..................................................... 342/357.31
See application file for complete search history.

(56) References Cited

U.S. PATENT DOCUMENTS

| 6,198,432 | B1 * | 3/2001 | Janky | G01S 19/11 |
| | | | | 342/357.44 |
| 6,336,076 | B1 * | 1/2002 | Farley | G01S 19/11 |
| | | | | 342/357.41 |
| 6,564,064 | B1 * | 5/2003 | Ciganer | G01S 19/46 |
| | | | | 455/11.1 |
| 6,653,976 | B1 * | 11/2003 | Janky | G01S 19/11 |
| | | | | 342/357.44 |

(Continued)

FOREIGN PATENT DOCUMENTS

| CA | 2804179 A1 * | 1/2012 | ............. G01S 19/11 |
| CN | 108897017 A  * | 11/2018 | |

(Continued)

OTHER PUBLICATIONS

"Electronic Code of Federal Regulations", Electronic Code of Federal Regulations (eCFR), Oct. 2020.

(Continued)

*Primary Examiner* — Harry K Liu
(74) *Attorney, Agent, or Firm* — M&B IP Analysts, LLC

(57) ABSTRACT

A system and method for providing navigation through an underground space. The method includes receiving ephemeris data of a plurality of satellites in orbit at a location of the underground space, determining a schedule of the plurality of satellites in orbit, obtaining location of a plurality of pseudolites within the underground space, and determining satellite parameters to configure each of the plurality of pseudolites. Satellite parameters are determined based on the obtained location of each pseudolites and the determined (Continued)

satellite schedule. Also, the satellite parameters include at least a signal modulation parameter and a broadcast data parameter. The method also includes configuring each of the plurality of pseudolites with the respective satellite parameters, and controlling the plurality of pseudolites to broadcast satellite signals based on the determined satellite parameters. The broadcasted satellite signals simulate locations of the plurality of satellites in orbit.

15 Claims, 5 Drawing Sheets

(56) References Cited

U.S. PATENT DOCUMENTS

| | | | |
|---|---|---|---|
| 9,638,804 B2 * | 5/2017 | Diao | G01S 19/11 |
| 9,903,954 B1 * | 2/2018 | Farley | H04B 7/18513 |
| 10,831,822 B2 * | 11/2020 | Greenberger | G06F 16/5866 |
| 11,202,173 B2 * | 12/2021 | Kim | H04B 7/1851 |
| 2005/0086001 A1 * | 4/2005 | Kim | G01S 19/11 |
| | | | 701/469 |
| 2006/0265127 A1 | 11/2006 | Qu | |
| 2012/0078511 A1 | 3/2012 | Lim | |
| 2013/0009815 A1 * | 1/2013 | Monnerat | G01S 19/11 |
| | | | 342/357.48 |
| 2016/0146616 A1 | 5/2016 | Ren | |
| 2017/0254902 A1 | 9/2017 | Ichinokawa | |

FOREIGN PATENT DOCUMENTS

| | | | | |
|---|---|---|---|---|
| WO | WO-2006002285 A1 * | 1/2006 | | G01S 19/05 |
| WO | WO-2020175018 A1 * | 9/2020 | | |

OTHER PUBLICATIONS

"Regulatory Framework for Indoor GNSS Pseudolites", Electronic Communications Committee (ECC) within the European Conference of Postal and Telecommunications Administrations (CEPT), ECC Report 168, May 2011.

"Regulatory Framework for Outdoor GNSS Pseudolites", ECC Electronic Communications Committee, ECC Report 183, Feb. 2013.

Abdelmoumen, Norrdine, "An Algebraic Solution to the Multilateration Problem", 2012 International Conference on Indoor Positioning and Indoor Navigation, Nov. 2012.

Kim, et al., "A Pseudolite-Based Positioning System for Legacy GNSS Receivers", Sensors 2014: ISSN 1424-8220, Mar. 2014.

* cited by examiner

SYSTEM AND METHOD FOR NAVIGATION WITH LIMITED SATELLITE COVERAGE AREA

TECHNICAL FIELD

The present disclosure relates generally to a system and method for navigation, and more specifically, to a system and method for enabling navigation of a vehicle in a limited satellite coverage area by managing a network of transmitters.

BACKGROUND

Satellites-based positioning systems are based on signals transmitted from satellites, or Space Vehicles (SV) (collectively referred to hereinafter as satellites or a satellite) orbiting earth that propagate through the atmospheric layers and reach an end user receiver. The signals received at a user side are used to measure the individual delay to each SV. Additionally, the SVs provide their ephemerides and clock information through periodically broadcasting messages that include the SVs' ephemeris and almanac data. Combining both the ranges measured with the SVs' instantaneous position formulate a set of equations, where their solution results in the users' position.

Also, Global Navigation Satellite System (GNSS) includes, as for today, four global operational constellations-Global Positioning Systems (GPS) (USA) with up to 32 satellites in orbit, Galileo (EU) with about 30 satellites, Global Navigation Satellite System (GLONASS) (Russia) with 24 satellites and Beidou (China) with 30 Medium Earth Orbit (MEO) satellites plus 5 Geostationary (GEO) satellites and about 16 more in the Beidou2 system. Overall, while the number of orbiting satellites exceeds 120, in practice some may be temporarily unavailable due to, for example, maintenance reasons.

Further, GNSS receivers conduct range measurements by synchronizing the signals code phase (i.e., base band version of the signal) and the carrier phase (i.e., a radio frequency carrier phase) per visible satellite out of a superset of GNSS constellations, or the group of satellites within the GNSS that are working together. Some GNSS receivers support most of the above-mentioned available constellations concurrently, such that range measurements are aggregated regardless of specific constellation. Here, the constellations are not geostationary, so managing the satellite's tracking and switching is performed constantly at the receiver side. At any time, only part of the superset of orbiting satellites is visible at any point on earth. With open sky conditions, approximately, ⅓ of the constellation is available for viewing at any time, which results in typical visibility of about 30 SVs.

Position, Navigation and Time solution (PNT) typically requires at least four satellites in view with their corresponding measurements at a GNSS receiver. In practice, more satellites are usually visible and are taken into the calculation to reduce errors and improve robustness. For example, some GNSS receivers use filters such as elevation mask to filter out low elevation satellites which usually induce larger errors. Other receivers scale as many satellites as possible with their associated received Signal-to-Noise-Ratio (SNR) to better optimize the PNT solution with the received noise. Multipath indicators and other information may also be used to optimize PNT solution. In general, receivers combine as much existing information to best perform a PNT solution given computation power or other limitations (e.g., battery, latency etc.). Finally, the PNT solution is vendor-specific, and considered to be a secret held by the equipment provider.

However, as the number of visible satellites falls, GNSS receivers may lose the ability to derive their PNT solution. Such cases may be found in areas where sky visibility is limited, for example, in underground parking lots, in tunnels, under indoor scenarios such as at malls and in indoor stadiums, and so on. The general rule for these cases is where the sky visibility by the receiver antenna is very limited, and the number of concurrently tracked satellites drops below the minimal requirements.

The related art suggests some solutions for incorporating beacon transmitters in GNSS indoor systems. In an example for such a solution, a GNSS beacon transmits a standard GNSS signal as if it is a satellite orbiting in space, except that the beacon is not being maneuvered (i.e., the beacon remains stationary), and the range is substantially shorter when compared to a GNSS standard satellite. As such, this solution is limited to indoor navigation applications.

Additionally, GNSS signal transmissions may be restricted due to regulatory limitations and spectrum frequency allocations that are reserved for military and civilian applications by regulators.

In view of the above discussion, there is a need for a solution that would allow accurate navigation when satellite's coverage is limited, while overcoming the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for providing navigation through an underground space. The method includes receiving ephemeris data of a plurality of satellites in orbit at a location of the underground space, determining a schedule of the plurality of satellites in orbit, obtaining location of a plurality of pseudolites within the underground space, and determining satellite parameters to configure each of the plurality of pseudolites. Satellite parameters are determined based on the obtained location of each pseudolites and the determined satellite schedule. Also, the satellite parameters include at least a signal modulation parameter and a broadcast data parameter. The method also includes configuring each of the plurality of pseudolites with the respective satellite parameters, and controlling the plurality of pseudolites to broadcast satellite signals based on the determined satellite parameters. The broadcasted satellite signals simulate locations of the plurality of satellites in orbit.

Certain embodiments disclosed herein also include a non-transitory computer readable medium having stored thereon causing a processing circuitry to execute a process, the process includes receiving ephemeris data of a plurality of satellites in orbit at a location of the underground space, determining a schedule of the plurality of satellites in orbit, obtaining location of a plurality of pseudolites within the underground space, and determining satellite parameters to configure each of the plurality of pseudolites. Satellite parameters are determined based on the obtained location of each pseudolites and the determined satellite schedule. Also, the satellite parameters include at least a signal modulation parameter and a broadcast data parameter. The method also includes configuring each of the plurality of pseudolites with the respective satellite parameters, and controlling the plurality of pseudolites to broadcast satellite signals based on the determined satellite parameters. The broadcasted satellite signals simulate locations of the plurality of satellites in orbit.

Certain embodiments disclosed herein also include a system for mobile underground navigation using a GNSS receiver. The system includes a plurality of a processing circuitry; and a memory, the memory containing instructions that, when executed by the processing circuitry, configure the system to receive ephemeris data of a plurality of satellites in orbit at a location of the underground space, determine a schedule of the plurality of satellites in orbit, obtain location of a plurality of pseudolites within the underground space, and determine satellite parameters to configure each of the plurality of pseudolites. Satellite parameters are determined based on the obtained location of each pseudolites and the determined satellite schedule. Also, the satellite parameters include at least a signal modulation parameter and a broadcast data parameter. The system is also configured to configure each of the plurality of pseudolites with the respective satellite parameters, and control the plurality of pseudolites to broadcast satellite signals based on the determined satellite parameters. The broadcasted satellite signals simulate locations of the plurality of satellites in orbit.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
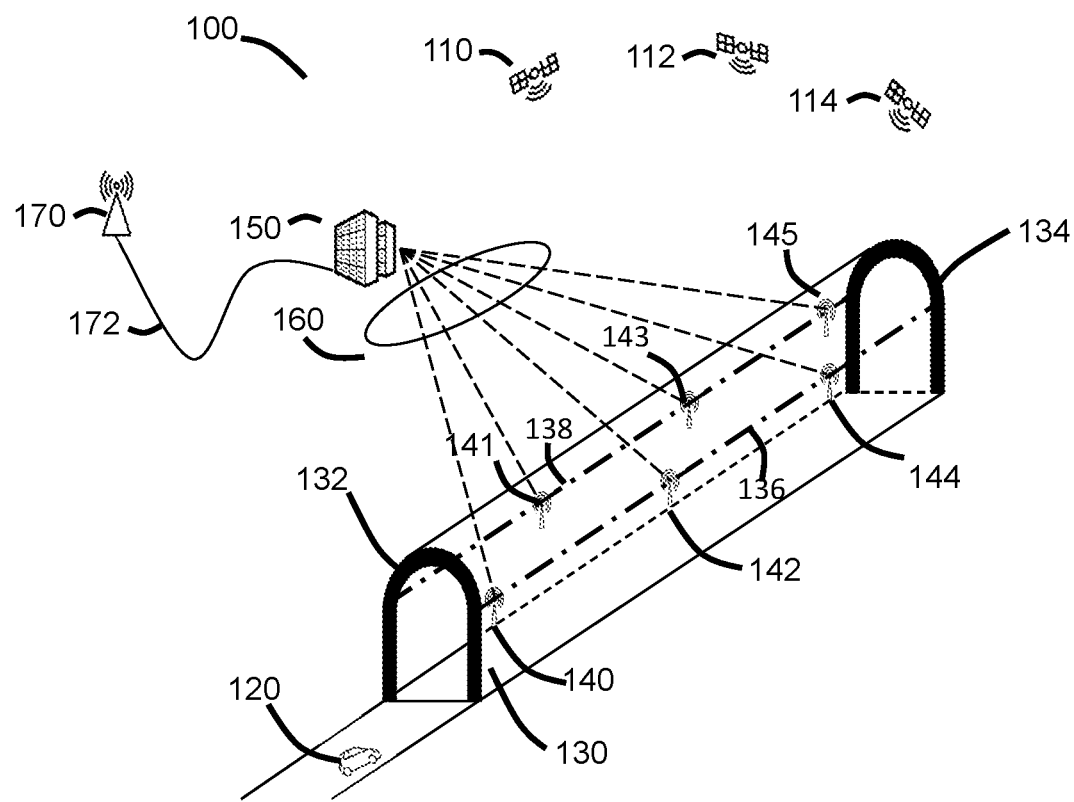
FIG. 1 is a diagram of a satellite network utilized to describe the disclosed embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for simulating Global Navigation Satellites System (GNSS) signals and transmitting the same using pseudolites (pseudo-satellite) in underground terrain. The system is deployed and operates concurrently with the existing GNSS satellites. Further, the disclosed system can operate with standard GNSS receivers or modified receivers. In an example embodiment, the system includes a plurality of transmitters deployed inside the underground space. The transmitters may be pseudolites that are centrally controlled to transmit signals embedding their positions. The simulated signals are compliant with the GNSS standard signals, and the embedded positions simulate an existing real-time GNSS constellation at the transmitters' (pseudolites) location. In an embodiment, a method for pseudolites self-location derivation in the underground space is also provided.

FIG. 1 shows an example diagram of a satellite network 100 utilized to describe the disclosed embodiment. The satellite network 100 includes satellites 110, 112, 114 in orbit. Also depicted in FIG. 1 is a vehicle 120 approaching a tunnel 130 to illustrate a general case of a mobile-connected device entering an underground space. Further, the vehicle 120 travels the tunnel 130 from its entrance 132 towards its exit 134. The vehicle 120 is equipped with a GNSS receiver (not shown) to receive transmission signals from a Control and Management Server (CMS) 150, and a wireless connection (e.g., cellular, Wi-Fi, etc.)(not shown) for communicating with other components of the satellite network 100. Along the tunnel walls there are transmission lines 136 and 138 (indicated by dash dotted lines) are installed on the tunnel side walls, floor, ceiling, or a combination thereof.

According to disclosed embodiments, a plurality of pseudolites (or transmitters) 140, 142, 144, 141, 143, and 145 are mounted along the transmission line 136, 138, with an inter-pseudolite distance of several meters (e.g., 50-100 meters). It should be noted that the number of pseudolites may be more than 6. In an example configuration, pseudolites 140, 142, 144 are associated with one side of the wall (e.g., right-hand with respect to the vehicle 120 heading into the tunnel 130, generally), while pseudolites 141, 143, 145 are associated with the opposite side wall, correspondingly.

All the pseudolites 140-145 are configurable and their radio signal parameters are controlled. Further, the configuration of such parameters may be performed remotely. In an embodiment, the controllable parameters include timing, satellite modulation code, data, power, and so on. The data may include metadata, ephemeris and in general refers to the data broadcasted by the pseudolite.

In an embodiment, the configuration of each parameter can be loaded with time stamp where at least one of the pseudolites 140-145 begins to transmit a compliant signal with the newly loaded configuration. That is, at least one of the pseudolites 140-145 is able to broadcast a signal (i.e. of previously loaded configuration) and concurrently receive a new configuration, store the new configuration, prepare the new signal, and switch to the new configuration signal upon indication from the time-stamp indicates.

In an embodiment, the CMS 150 is adapted to monitor, configure, and control the pseudolites 140-145. By configuring and controlling the pseudolites 140-145, the following parameters can be set: signal delay with respect to the GNSS time coordinates, constellation selection (i.e., the selection of satellites 110-114 to work together within the GNSS) and satellite ID signal parameters (e.g. constellation: Galileo, Glonass, GPS or Baidou and SV id=[1,2,3, . . . ] etc.); broadcasted data (e.g. ephemeris data) of the satellites, 110-114, and so on.

In an embodiment, the CMS 150 may be implemented as a physical machine, a virtual machine, or combination thereof. An example block diagram of the CMS 150 is discussed below.

The CMS 150 may be deployed in a cloud computing platform, a data center, or on-premises (e.g., in a traffic control room). Also, the CMS 150 may be centralized or distributed system. Further, the CMS 150 may receive or provide information over the network regarding the GNSS constellation state among the satellites 110-114 and pseudolites 140-145 surrounding and within the tunnel's area, including corrections and parameters to improve control and performance. Here, the GNSS constellation refers to the satellites 110-114 and the pseudolites 140-145 that work together within the GNSS.

The CMS 150 is configured to turn on and off some or all of the pseudolites 140-145, on demand. The CMS 150 may serve several tunnels, or may be allocated to a single tunnel or tunnel segment.

The CMS 150 is also connected to each of the pseudolites 140-145 via a communication link 160 with all the pseudolites 140-145, where control signals may be transmitted from the CMS 150 to the pseudolites 140-145. Without loss of generality, the communication link 160 in FIG. 1 illustrates a star configuration of the CME control network of the pseudolites 140-145. Other configurations are also considered without loss of functionality such as, ring, mesh, hybrid, and the like. The communication link 160 may be wireline, such as dedicated wiring, or over powerlines or leased wirelines to name a few. Other configurations such as wireless connections, fiber, or combination of those are also noted as potential communication connections.

The satellite network 100 further includes a GNSS receiver 170 connected through a data link 172 to the CMS 150. The GNSS receiver 170 is utilized to collect real time information of the GNSS scene in the area of the tunnel 130, and to monitor signals received from the pseudolites 140-145 to conform to regulations. The GNSS receiver 170 may also be in the form of several receivers deployed in close vicinity to each tunnels' exit. The data collected through data link 172 provides a real time status of the GNSS constellation and visible satellites 110-114 out of the tunnel 130, along with the satellites' location (i.e., azimuth and elevation) and heading (i.e., whether satellites 110-114 are rising or setting).

It should be noted that a standard GNSS receiver 170 typically includes a radio circuit connect to an antenna, a measurement engine, and a positioning engine. The positioning engine converts a list of range measurements (provided by the measurement engine) to satellites and their respective locations. The positioning engine may also determine a set of calibration parameters related to the receivers' location. The positioning engine is also responsible to turn range-rate measurements (also provided by the measurement engine) to receivers' velocity. Additionally, the positioning engine estimates the receiver clock bias and metrics indicating the quality of the resulting estimates (e.g. two-dimensional root mean squared error—2 dRMS, three-dimensional root mean squared error—3 dRMS, Geometric dilution of precision GDOP etc.). The data provided by the engine may be utilized by an application (e.g., a map app).

In an embodiment, the functionality of a position engine may be implemented in the CMS 150. In another embodiment, discussed below, a position engine included in a standard GNSS receiver (e.g., receiver 170) may be utilized. In an yet another embodiment, a standard GNSS receiver (e.g., receiver 170) is updated (e.g., through a software application or code) to support the functionality of a position engine.

According to the disclosed embodiments, the CMS 150 is configured to control the pseudolites 140-145 to generate and transmit signals simulating the satellites 110, 112, 114. That is, pseudolites 140-145 radio signals to which to any GNSS receive in the vehicle would be viewed as legitimate satellites signals providing the accurate location of the vehicle.

In an embodiment, each of the pseudolites 140-145 may be implemented as a software-defined radio circuit (not shown) to allow the CMS 150 to fully set the signals transmitter by a pseudolite. Software-defined radio is a radio communication system where components that have been traditionally implemented in hardware (e.g. mixers, filters, amplifiers, modulators/demodulators, detectors, etc.) are instead implemented by means of software on embedded system. The operation of the CMS 150 is discussed in greater detail in FIG. 2.

Figure 2:
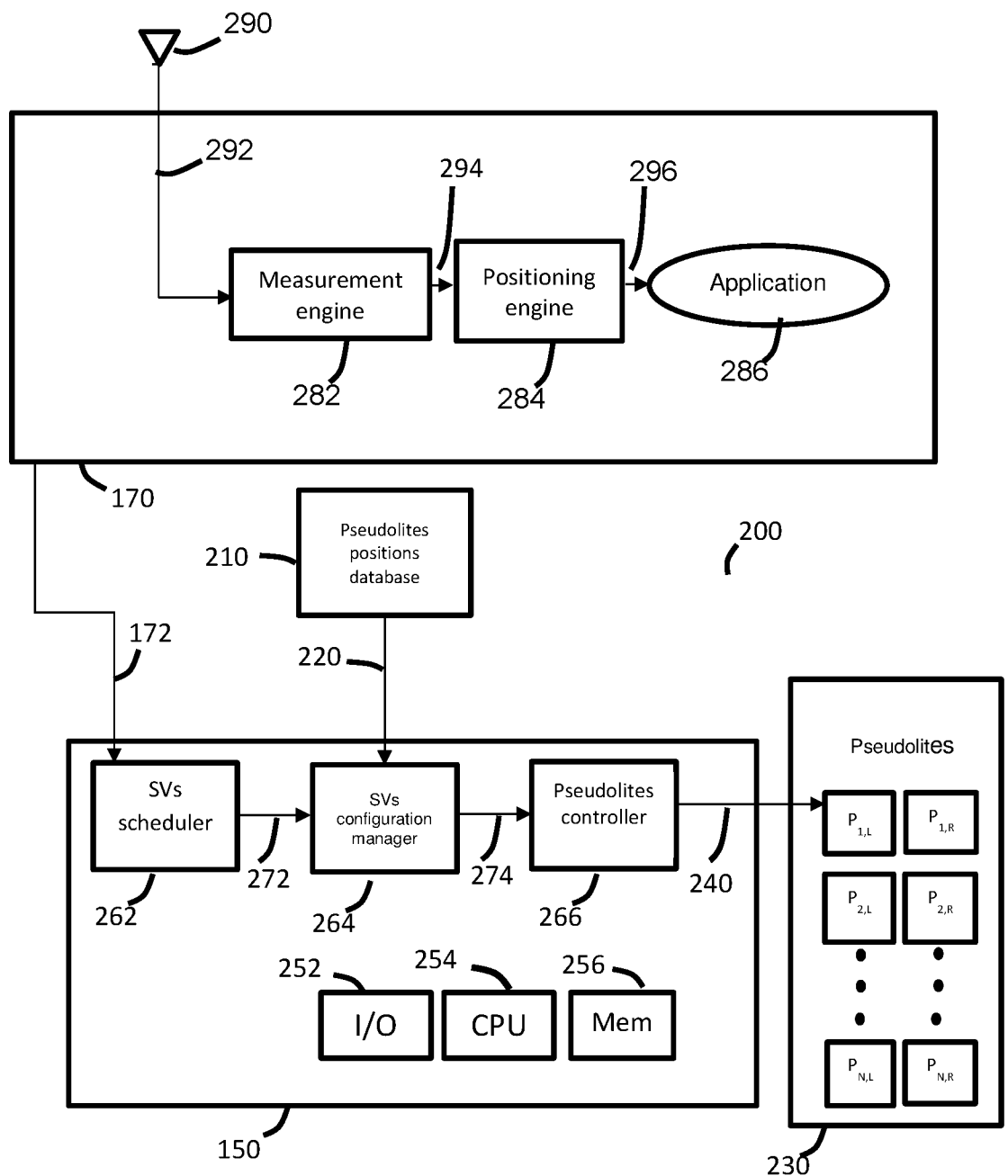
FIG. 2 is a block diagram of a GNSS system, according to an embodiment.

FIG. 2 illustrates an example block diagram of a GNSS system 200, according to an embodiment. The GNSS system 200 includes a pseudolites positions database 210, the CMS 150 connected to the 210 via an interface 220, a pseudolites cluster 230 connected to CMS 150 via another interface 240, and the GNSS receiver 170 connected to the CMS 150 via the interface 172.

The CMS 150 is configured to collect real time data (i.e., ephemeris data of satellites 110-114 and pseudolites 140-145) from GNSS receiver 170 through an interface, such as a data link 172. Here, the GNSS receiver 170 may either be located in close proximity of or remotely to the CMS 150. In both cases, the data may be transmitted to the CMS 150 through the data link 172, which could be wireless or wireline or combination of both under a proprietary or standard-based communication protocol. Also, data collected by the CMS 150 includes the locations of satellites 110-114 that have a clear Line-of-Sight (LOS) of the tunnel 130, and the headings of the satellites 110-114. Further, by "real time," it is meant that the data that is transmitted to and collected by the CMS 150 is substantially instantaneous, within a range from a few seconds to a few minutes in lag time.

Separately, the data collected (e.g., by the CMS 150) regarding the positions of the pseudolites 140-145 may be stored in the database 210. The database 210 may be connected to the CMS 150 through a network, or may be coupled to the CMS 150-through an interface 220.

A cluster of pseudolites 230 also interfaces with the CMS 150, mounted along, for example, the tunnel 130 (see for example, FIG. 1, above). For the sake of illustration, the pseudolites 140-145 are indexed by 1 to N for the right side wall and left (i.e., opposite) side wall, correspondingly using a subscript tuple (x,s), where x indicates the pseudolite index, and s indicates the side of wall. For "s", "L" and "R" indicate the "left" and "right" sides of the wall in the tunnel 130, correspondingly. However, the numbering methods can be selected freely as long as the pseudolite index is unique for the sake of system control and setting up. In an embodiment, the structure of the cluster of pseudolites 230 is controlled through an interface 240.

In an embodiment, the CMS 150 includes an Input/Output (I/O) network interface 252, a processing circuit 254, such as a central processing unit (CPU), and a memory 256.

Additionally, a processing circuit 254, a scheduler 262, a configuration manager 264, a pseudolites controller 266 may separately be included in the CMS 150.

The scheduler 262 is configured to receive the satellites constellation data from the data link 172, and generate a satellites schedule of the satellites 110-114 (i.e., ephemeris data) for the pseudolites cluster 230. In an embodiment, the satellites schedule may include the currently non-visible list of satellites 110-114 (i.e., satellites 110-114 that may not be visible to the GNSS receiver 170) complimentary to the schedule delivered by the GNSS receiver 170 through the data link 172 regarding all of the available satellites 110-114 circling above the tunnel 130. The schedule prevents the signals transmitted from satellites 110-114 in view of the GNSS receiver 170 from colliding with the pseudolites transmissions at any given time point, in order to avoid GNSS signal from being interfered by signals from the pseudolites cluster 230, and to avoid satellites/pseudolites metadata conflicts. As the constellation of the satellites 110-114 changes with time, the scheduler 262 is configured to refresh the list in order to comply with the regulation and the baseline of interference-free system.

In an embodiment, an implementation of the scheduler 262 for managing a list of satellites 110-114 that are not in view of the GNSS receiver 170 is presented below, as will be described in detail in FIG. 3. The list is ordered by the satellites' expected non-visible time period, where a satellite that is closer in time to become available for allocation, or is available for a longer time period is given a higher priority in the list. This list can be managed by tracking the historical orbits of the satellites, as the satellites cyclically orbit the Earth. Here, the update rate of the list in a periodical implementation (i.e. synchronous fashion) can be around once per few minutes, based on the satellite's angular velocity. In an embodiment, the update of the list may be triggered by demand. At the same time, the pseudolites are allocated to the list of satellites needs to be repeatedly refreshed by the scheduler 262.

As an allocated satellite moves close to a position visible to the GNSS receiver 170 (e.g., rising satellite), a change of a pseudolite allocated with this satellite needs to be taken in order to avoid collision of transmission signals sent from the pseudolites and the rising operational satellite. Here, "satellite ID" is used for a specific pseudolite allocation with the operational satellite, as an 'indexed satellite' or 'identified satellite'. A satellite ID allocation process implements a "pulling" of a highest priority satellite ID from the top of the satellite scheduling list, and a "plugging" of a separate previously released (i.e., pulled) satellite ID to the bottom of the list for future use (i.e. the lowest priority in the list). An exemplary outlined disclosed implementation flow is presented in FIG. 3.

Once a satellite ID schedule changes, the scheduler 262 is configured to send a message indicating a new schedule through interface 272 to a configuration manager 264. The message sent through the interface 272 can be in many forms, including a full list of satellites and pseudolites within the new schedule, a differential list including only the pseudolites, or a single pseudolite schedule and its associated satellite ID allocation. The protocol of the message can be in the form of push or pull.

The configuration manager 264 is configured to derive a set of parameters to configure the pseudolites 141-145 based on the pseudolite position (i.e. as noted in the pseudolite positions database 210 and accessed through interface 220, and the satellite ID (provided from the scheduler 262 through interface 272). The pseudolites 141-145 may be configured to include a set of parameters that configure the pseudolite transmission to be compliant with the GNSS system. Therefore, from the GNSS receiver's perspective, when the pseudolite transmission is received by the GNSS receiver 170, the transmission would appear as if the pseudolite was an authentic satellite in orbit. The parameters may be classified into two segments: physical signal modulation parameters; and broadcasted data.

With respect to the physical signal modulation parameters, the examples of the parameters may include the modulation pseudorandom code, and timing alignment with respect to the GNSS system and transmission power. Also, with respect to the broadcasted data, the parameter may include the satellites ephemerides parameters. These satellites ephemeris parameters are manipulated so that the derived satellite position and the pseudolite position (i.e., the position) may be derived and stored in the pseudolites positions database 210).

As the ephemerides are derived from the broadcasted ephemeris data from the satellites 110-114, which includes over fifteen parameters, manipulation of the pseudolite location can be performed in many ways. An example of ephemeris data manipulation is to shift the time coordinate of a pseudolite with respect to the GNSS standard time (i.e. using $t_{oe}$, the time reference for the ephemeris data). Other parameters manipulation may include locating the pseudolite in space right above the pseudolite location. Here, "right above" is a position on a line connected towards the center of the Earth, the line including the pseudolite location and a point on the line at an altitude of 20,000 km above a surface of the earth, the point in space being scaled back toward the Earth surface at the GNSS receiver 170 side by a known factor (roughly ⅓). This method projects the computed location to Earth's ground level where the cluster of pseudolites 230 typically reside. In an embodiment, a satellite clock bias may be manipulated to be fixed, and the broadcasted satellites orbit parameters may be set up, so that the pseudolite position reflected from a broadcasted satellite orbit parameter will end up in the pseudolite's exact location in the tunnel, which may be used to determine the pseudolites' position.

An additional way to manipulate the pseudolite location is by plugging non-conventional values into one or few parameters to signal the GNSS receiver 170 that the interpretation of the ephemeris data needs to be other than standard. Here, some of the above listed approaches may not comply with standard GNSS receiver ephemeris data decoding methods. However, the expected result of the later proposed approach may cause a denial of service to a conventional receiver, while enabling service to allowed customers.

In an embodiment, a field (e.g., SVhealth field) may be configured to indicate malfunctioned satellite, which may be ignored by regular GNSS receivers 170, but may be used by receivers 170 that have been allowed to access. In an embodiment, an additional set of ephemerides may be sent from the CMS 150 to allowed users. Here, general receivers 170, will ignore the pseudolites signals, but allowed receivers may accept the pseudolites' signals. Alternatively, an additional set of ephemerides over the network may be sent from the CMS 150 to allowed (e.g., registered) users. One example of this approach is by transmitting a $t_{oc}$ parameters with value larger than 38400 (which is out of the valid range for this parameter) to the allowed users.

Similarly, the metadata can be transferred to the allowed users via a wireless communication interface, ensuring that only registered users to the service can use the signals transmitted from the pseudolites allows for security of data transmission from the pseudolites. The transferring of the metadata via the wireless communication interface enables more flexibility in formatting parameters in a non-standard manner (i.e., not compliant with GNSS specifications). Furthermore, the cluster of pseudolites 230 can each be assigned with identification numbers (satellite ID) of non-operative/non-existing satellites. Additionally, the system 200 may also leverage the status of healthy broadcasted fields as part of the pseudolites ephemeris, by setting the service in a manner so that regular receivers will omit the satellites 110-114, yet receivers of registered users will be able to use the satellites 110-114.

In another embodiment, the location of the pseudolites 140-145 inside a tunnel 130 or an underground space may be transmitted to the GNSS receiver 170 via an external communication link, such as the data link 172 (towards which the receiver 170 is communicatively connected). This can be performed, for example, in a peer-to-peer communication format, where each of the pseudolite 140-145 reports its location to the receiver 170 in close vicinity over a short-range communication link (e.g. UHF, Wi-Fi, Bluetooth, etc.).

In an embodiment, a pseudolite location may be published in a list over a server (not shown) where the receiver 170 may retrieve the pseudolites' location. In another embodiment, the pseudolites' metadata may be broadcasted by the first pseudolite in the tunnel 130 (i.e., the pseudolites 140 closest to the entrance 132 of the tunnel, representing all of the pseudolites within the entire tunnel structure to an approaching mobile device within the approaching vehicle 120. It should be appreciated that although this latter option may not comply with a standard GNSS receiver, decoding and processing flow enable provisioning control to a closed group of customers base only.

Returning to FIG. 2, the GNSS receiver 170 includes an antenna 290, an antenna interface 292, a measurement engine 282, a positioning engine 284, an interface 294 connecting an output of the measurement engine 282 to the positioning engine 284, an application 286, and an interface connecting the positioning engine 284 to the application 286.

The measurement engine 282 provides range and range-rate measurements based on signals received from the antenna 290 over the interface 292. The positioning engine 284 determines a list of range measurements from the GNSS receiver 170 to the satellites 110-114, and the respective locations of the satellites 110-114. In an embodiment, the position engine 284 may also determine calibration parameters to the location of the GNSS receiver 170.

To derive the location of the satellites 110-114, the position engine 284 within the GNSS receiver 170 implements the pseudo ranges with multilateration algorithms. Here, the positioning engine 284 is configured to convert the range-rate measurements provided also by the measurement engine 282 through the interface 294 into receivers' velocity. Additionally, the positioning engine estimates the receiver clock bias and metrices that indicate the quality of the resulting estimates (e.g. two-dimensional root mean squared error—2 dRMS, three-dimensional root mean squared error—3 dRMS, Geometric dilution of precision GDOP etc.).

The results determined by the positioning engine 284 are further transmitted through the interface 296 to an application 286 that uses the location estimate of the satellites 110-114 for potentially: displaying the results, and controlling or communicating with other elements of the GNSS system 200.

Further, the communication interfaces 294 and 296, and other similar interfaces discussed transfer digital communication as is, or after compressing the data to be transferred. Correspondingly, the interfaces 294, 296, along with the other interfaces discussed, may decompress the data received for communication efficiency, power consumption reduction, and the like. The same may apply for wireless communication interfaces where data is transferred bidirectionally with remote entities.

In another embodiment, a mobile user receiver (not shown) can receive with the pseudolites positions (obtained from the pseudolites positions database 210). Further, the pseudolites positions held in the pseudolites positions database 210 assist the GNSS receivers 170 by transmitting the ephemeris of real GNSS of the satellites 110-114 that are available at the tunnel exits 134 provided by the cloud or CMS 150. Conventional GNSS satellite signal acquisition performance may be enhanced once the vehicle 120 exits the tunnel 130. Therefore, the disclosed embodiments provide a smooth transmission of signals when the vehicle 120 navigates into and out of the tunnel 130.

In FIG. 2, the configuration parameters as discussed previously are transferred to a pseudolites controller 266 within the CMS 150 through an interface 274. The pseudolites controller 266 is configured to translate the configuration parameters, and is configured to set up a selected pseudolite, so that the selected pseudolite will comply with the required signal generation protocol.

In an embodiment, the satellite parameters provided by the pseudolites controller 266 may generate a samples vector that is transmitted to the selected pseudolite, where the pseudolite up-converts the samples vector to radio frequency (RF) and broadcast the samples vector. With the flow listed here the entire baseband signal generation is carried out remotely out of a pseudolite system, and the pseudolite may upconvert the baseband samples to radio frequency.

In another embodiment, the pseudolites controller 266 is configured to send the satellite parameters as they are, or may compress or encode the satellite parameters based on a pre-defined encoding scheme to the cluster of pseudolites 230. The control data set may define a time stamp that identifies the cluster of pseudolites 230 that will start transmitting the new configuration signal. This later approach implies that each of the cluster 230 of pseudolite has an internal computing and processing entity that is able to generate the baseband signal samples from the satellite parameters delivered and upconvert the baseband signal samples to a compliant GNSS radio signal onboard.

The cluster of pseudolites 230 receives the control data and other satellite parameters through an interface 240. Here, the space structure of the cluster of pseudolites 230 is represented by two columns. Each pseudolite subscript tuple (i,j) indicates the pseudolite index along the tunnel 130 and the tunnel side where 'L' stands for 'left side' and 'R' indicates the tunnels' 'right side'. It is important to note that this simple indexing method given here is for illustration purpose only. Other naming and indexing methods are acceptable as long as the cluster of pseudolites 230 are uniquely identified by the pseudolite controller 266. For example, any arbitrary single dimensional (1D) indexing (i), two dimensional (2D) indexing (i,j) or three dimensional (3D) indexing (i,j,k) where i, j and k are indexes suites this need. The 3D case may be use, as an example, for multi-level underground parking. Further, a 3D indexing also suits a case where multiple tunnels reside in close vicinity and are controlled centrally by a single CMS. In the latter case, one of the entries to the three-elements index may serve as a tunnel identification number.

Figure 3:
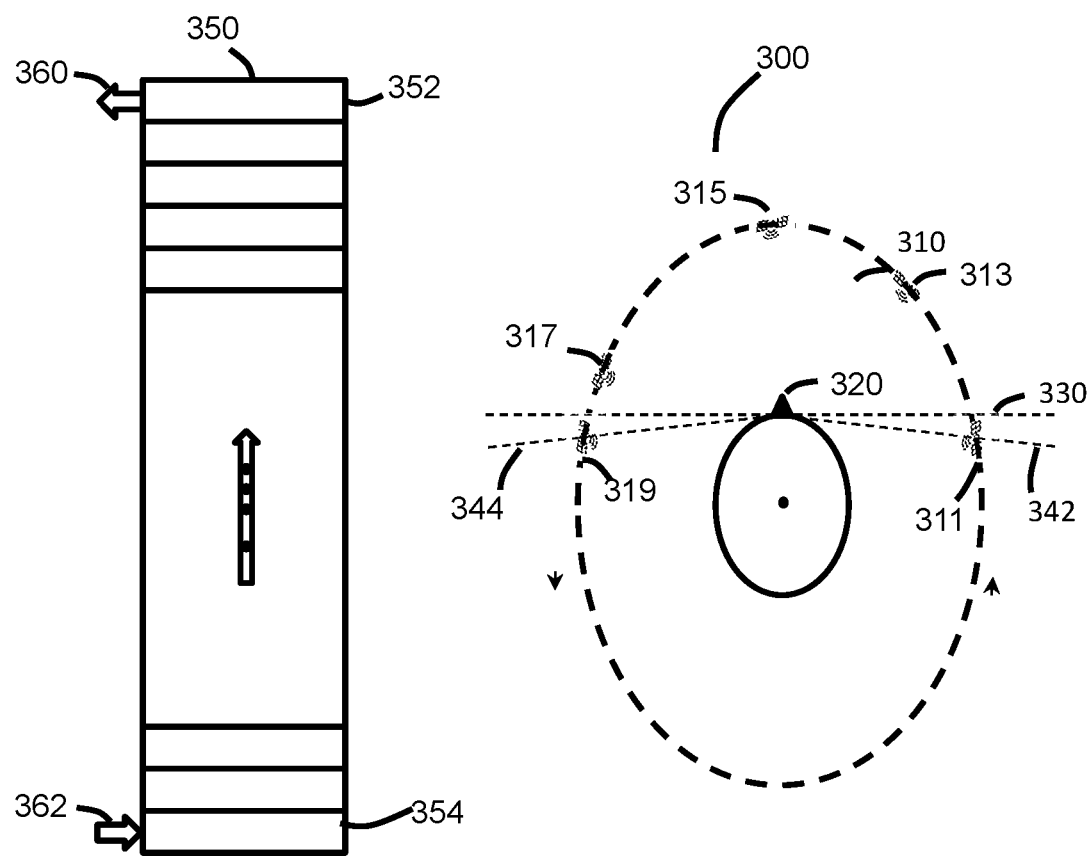
FIG. 3 is a diagram of an allocation of an orbiting satellite from a list of satellites available for allocation, according to an embodiment.

FIG. 3 shows an example diagram 300 of an allocation of an orbiting satellite from a list of satellites available for allocation, according to an embodiment. Here, a single satellite (e.g., a satellite 110) in an orbit 310 in a counter-clockwise direction around earth with five indications of its positions 311-319 along this orbit 310 is shown. The ground position 320 of the tunnel 130 is indicated by a dark triangle, where a dashed line 330 indicates the horizon with respect to the tunnels' position 330. Two additional lines 342, 344 indicate margins (e.g. spare regions for compliance with regulation purposes) one for the rising direction 342 and the other for the setting direction 344. Satellites' position 311 indicates a satellite approaching to a rise up position.

This state triggers a checkup to verify if one of the pseudolites is allocated with this satellite parameters. If this is the case, this checkup invokes a pseudolite allocation switching mechanism managed by the CMS 150. As long as the satellite is visible (at positions 313-317) (i.e., where position 315 is the highest point at visible sky with respect to the scene) an ID number identifying this satellite is omitted out of an available satellites list 350. The list 350 may be organized in many forms. The underlined design for this list 350 is that it is easy to pull out satellite ID for use at any time instance the system requires so.

In the tunnel 130, the satellites allocation may be used along the underground space cyclically in a reusable fashion. Furthermore, going deeper in the tunnel 130, the system may use the satellites 110-114 in view as long as the transmitted signals of pseudolites 141-147 with the same satellite ID do not interfere with each other. In this later case the scheduler 262 can apply a fixed allocation method due to the inherent decoupling from the inner tunnel to the out-of-tunnel space.

According to an embodiment, the list 350 is maintained by placing the satellite crossing the setting direction 344, at position 319 at the top 352 of the list 350, as it is expected to have this satellite in a use state for the longest time, and therefore has the most time of availability. Satellite which is allocated to a certain pseudolite and approaches the rising time 342 at position 311 will be placed at the bottom of the list 354. In another embodiment, the list 350 is organized periodically by ordering all non-visible satellites by their 'dark time' period in a descending order (i.e. by 'dark time' it is defined as the time point of a satellite not being visible including the time margins before it rises at position 311, and after it sets at position 319). The satellite with the longest time of usability will be placed in the top side of the table 352, while the satellite with least time of usability will be placed in the bottom of the table 354. This placing and moving of the satellite ID within the list 350 may occur periodically (e.g. every 15 mins) or triggered by demand.

Once a satellite allocation request appears, the top ranked satellite '352' is pulled out for allocation 360, the occurrence of which may also be used to trigger another refresh of the list 350. At the same time, as the satellite approaches the rising position 311 and becomes the least available, the satellite is placed back 362 from being allocated on the bottom of the list 354.

It is further noted that the list 350 is not the only option for implementing this function. In an embodiment, a software routine may be suggested by having all the involved parameters in the setting (e.g., all satellites that are usable, their position in [x, y, z] or [azimuth, elevation], time-of-day, etc.) to derive the best usable satellite (i.e., usable for the longest time) for allocation. Another implementation can use calculation of the schedule in advance for a substantial period (e.g. day, week, month etc.) and use it as a static information table.

Figure 4:
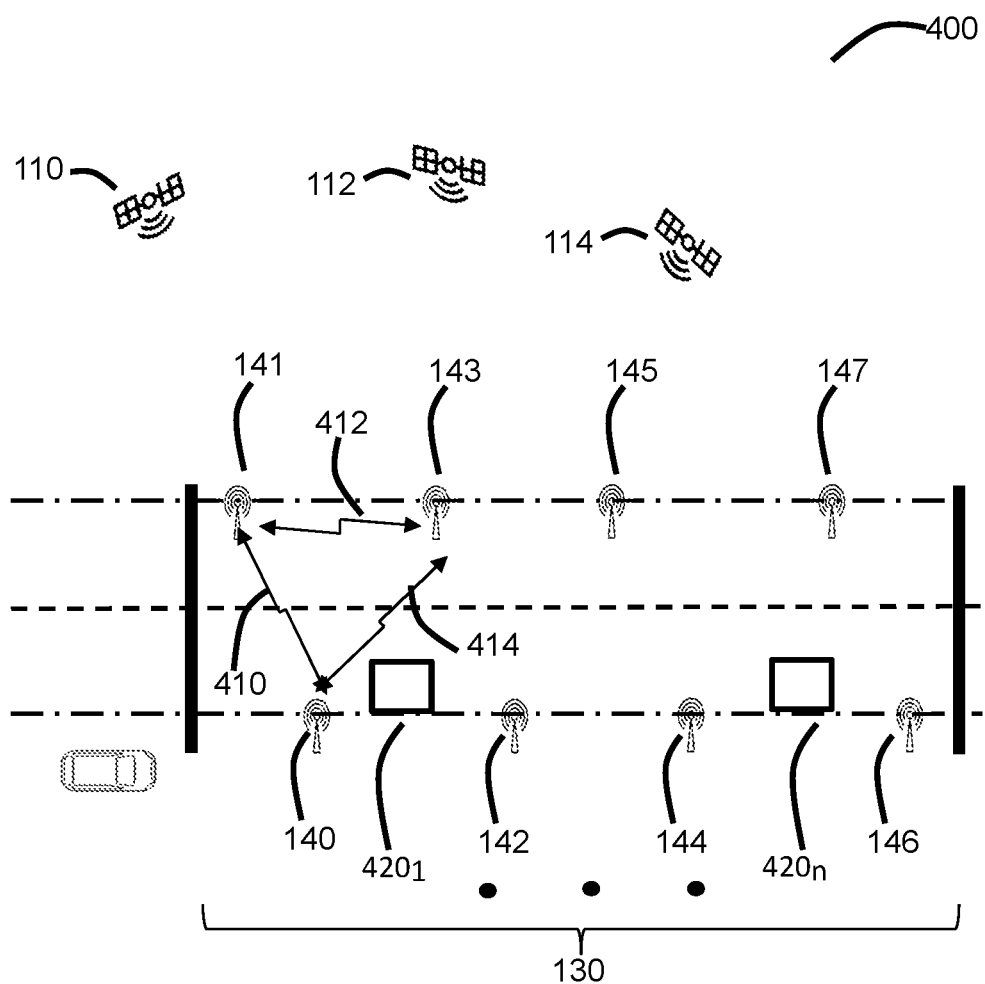
FIG. 4 is a diagram of a top-down view of a tunnel, according to an embodiment.

FIG. 4 shows an example diagram 400 of a top-down view of a tunnel, according to an embodiment. The tunnel 130 is mounted with pseudolites 141, 143, 145, 147 on the left side wall with respect to the vehicle heading, and pseudolites 140, 142, 144, 146 to the right-side wall with respect to the vehicle heading. GNSS satellites 110, 112, 114 fly overhead the tunnel 130. Here, the pseudolites 140-147 may be installed in a distributed fashion, where the baseband elements are placed remotely in a server room and the RF frontends are mounted on the walls or as a full unit mounted remotely controlled.

As for the exact positioning of the pseudolites' antennas, in one embodiment, the antennas' exact positioning is measured manually. In another embodiment, the determined location of the pseudolites' antennas are mounted in pre-defined spaces/distances. In this case, the location of the pseudolites antennas are derived with reference to a single pseudolite antenna position (e.g. at the entry 132 of the tunnel 130) is obtained using the predefined distance parameters. In another embodiment, the positions of the antennas are derived autonomously by applying range measurements between the pseudolites antennas. The arrows 410, 412, 414 indicate the ranges between pseudolites 140, 141; pseudolites 141, 143; and pseudolites 140, 143, respectively. The range measurements can be carried out using additional GNSS receivers (not shown) integrated with pseudolite station $420_1$-$420_n$ (hereinafter pseudolite stations 420 or pseudolite station 420).

In another embodiment, a dedicated ranging RF based transceiver can be integrated with a pseudolite such as UWB, Wi-Fi and other. In this case, the range measurements can be performed using several techniques such as time-of-arrival (ToA), time-difference-of-arrival (TDoA), time-of-flight (ToF), etc. To derive each of the pseudolite-stations 420 mounted on the tunnel wall location autonomously, at least three known positions of pseudolites in a close vicinity to the pseudolite station 420 are required. Given the positions of this close vicinity, minimal set of pseudolites and measuring the range of these pseudolites with to those of the other pseudolites with unknown location, the locations of the unknown pseudolites may be determined (i.e. in transmit and receive distance). For example, a sequential positioning process using an autonomous pseudolite positioning scheme may be applied, where the process starts with three pseudolites with known fixed locations (e.g. the first pseudolites may be in close vicinity and out of the tunnel 130).

Alternatively, dedicated devices designed to acquire the pseudolites' positions (e.g., based on traditional GNSS precise positioning technique) are positioned temporarily outside of the tunnel. In this embodiment, the pseudolite with an unknown location measures the range to the three (or more) first pseudolites with a known location pseudolites to derive its own location. The process can be based on at least three known location pseudolites (that will play the role of anchors), and it is assumed that the pseudolites 140-142 are located at the area. This way, the anchors (i.e., the pseudolites with the known fixed locations) can derive their locations based on the operational GNSS satellites 140-142. Once the anchors' locations are derived and fixed, a next pseudolite station 420 residing, for example, one stage deeper into the tunnel starts to perform ranging measurements, according to FIG. 4, to all the pseudolites with known locations (i.e., anchors). This process sequentially progresses stage by stage into the tunnel and continues until it acquires all the tunnels' pseudolites locations.

Figure 5:
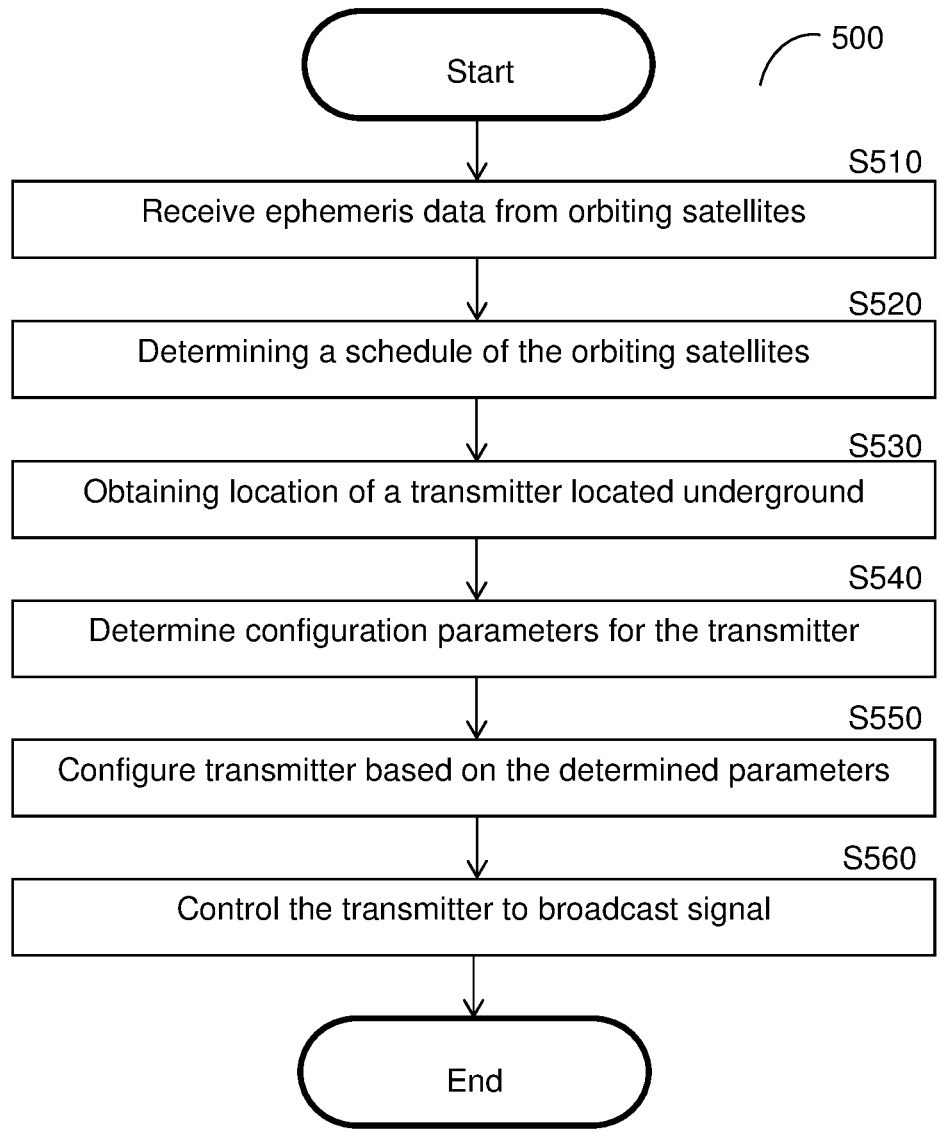
FIG. 5 is a flowchart illustrating a method for providing navigation underground, according to an embodiment.

FIG. 5 is an example flowchart 500 illustrating a method for providing navigation underground, according to an embodiment. The method 500 may be performed by the CMS 150.

At S510, ephemeris data of a plurality of satellites in orbit is received. Next, at S520, a schedule of the plurality of satellites in orbit is determined based on the received ephemeris data. At S530, a location of each pseudolite within an underground space is obtained. Then, at S540, a plurality of satellites parameters to configure the pseudolites based on their obtained locations of the satellites' schedule is determined. Here, the plurality of satellites parameters may include one of a physical signal modulation parameter or a broadcast data parameter.

Next, at S550, each pseudolites is configured with the plurality of the pseudolites parameters determined for the respective pseudolite. Then, at S560, each pseudolite is controlled to broadcast a signal based on the configured satellites parameters. The signals broadcasted by the pseudolites simulate the GNSS signals as would have been transmitted by the satellites in orbit.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for providing navigation through an underground space, comprising:
   receiving ephemeris data of a plurality of satellites in orbit at a location of the underground space;
   determining a schedule of the plurality of satellites in orbit;
   obtaining location of a plurality of pseudolites within the underground space;
   determining satellite parameters to configure each of the plurality of pseudolites, wherein the satellite parameters are determined based on the obtained location of each pseudolite and the determined schedule, and wherein the satellite parameters include at least a signal modulation parameter and a broadcast data parameter, wherein the schedule of the plurality of satellites in orbit includes a list of a plurality of satellite IDs, each of the plurality of satellite IDs corresponding to one of the plurality of satellites in the orbit;
   configuring each of the plurality of pseudolites with the respective satellite parameters; and
   controlling the plurality of pseudolites to broadcast satellite signals based on the determined satellite parameters, wherein the broadcasted satellite signals simulate locations of the plurality of satellites in orbit, wherein:
      the satellite ID corresponding with a satellite that has a longest time of usability for allocation with the pseudolite, and is in a setting position is placed at a highest priority of the schedule for allocation; and
      the satellite ID corresponding with a satellite that has a shortest time of usability for allocation with the pseudolite, and is in a rising position is placed at a least priority of the list for allocation.

2. The method of claim 1, wherein further comprising:
   determining the locations of the plurality of pseudolites based on relative range measurement.

3. The method of claim 2, further comprising:
   determining a location of a first set of plurality of pseudolites based on an allocation of at least one of the first set of plurality of pseudolites with the plurality of satellites;
   determining a range from the first set of plurality of pseudolites to a second set of plurality of pseudolites; and
   determining location of additional plurality of pseudolites, based on the determined location of the at least three plurality of pseudolites.

4. The method of claim 1, further comprising:
   allocating each of the plurality of pseudolites with the list of the plurality of satellite IDs corresponding with a plurality of non-visible satellite, based on the schedule, upon the movement of the satellite out of the visible position;

updating the schedule of the plurality of satellites in orbit, upon a movement of the plurality of satellites into or out of a visible position for allocation with the pseudolite; and providing the updated schedule.

5. The method of claim 1, wherein the schedule is ordered by an amount of time a satellite is available for allocation with the pseudolite.

6. The method of claim 1, wherein each of the plurality of pseudolites is configured with samples vector derived based on the determined satellite parameters.

7. The method of claim 1, wherein the broadcasted satellites signal by are compliant with other signals broadcasted by the plurality of satellites in orbit.

8. A non-transitory computer readable medium having stored thereon instructions for causing a processing circuitry to execute a process, the process comprising:
 receiving ephemeris data of a plurality of satellites in orbit at a location of the underground space;
 determining a schedule of the plurality of satellites in orbit;
 obtaining location of a plurality of pseudolites within the underground space;
 determining satellite parameters to configure each of the plurality of pseudolites, wherein the satellite parameters are determined based on the obtained location of each pseudolites and the determined schedule, and wherein the satellite parameters include at least a signal modulation parameter and a broadcast data parameter, wherein the schedule of the plurality of satellites in orbit includes a list of a plurality of satellite IDs, each of the plurality of satellite IDs corresponding to one of the plurality of satellites in the orbit;
 configuring each of the plurality of pseudolites with the respective satellite parameters; and
 controlling the plurality of pseudolites to broadcast satellite signals based on the determined satellite parameters, wherein the broadcasted satellite signals simulate locations of the plurality of satellites in orbit, wherein:
  the satellite ID corresponding with a satellite that has a longest time of usability for allocation with the pseudolite, and is in a setting position is placed at a highest priority of the schedule for allocation; and
  the satellite ID corresponding with a satellite that has a shortest time of usability for allocation with the pseudolite, and is in a rising position is placed at a least priority of the list for allocation.

9. A system for mobile underground navigation using GNSS receiver, comprising:
 a plurality of pseudolites;
 a processing circuitry; and
 a memory, the memory containing instructions that, when executed by the processing circuitry, configure the system to:
 receive ephemeris data of a plurality of satellites in orbit at a location of the underground space;
 determine a schedule of the plurality of satellites in orbit;
 obtain location of a plurality of pseudolites within the underground space;
 determine satellite parameters to configure each of the plurality of pseudolites, wherein the satellite parameters are determined based on the obtained location of each pseudolites and the determined schedule, and wherein the satellite parameters include at least a signal modulation parameter and a broadcast data parameter, wherein the schedule of the plurality of satellites in orbit includes a list of a plurality of satellite IDs, each of the plurality of satellite IDs corresponding to one of the plurality of satellites in the orbit;
 configure each of the plurality of pseudolites with the respective satellite parameters; and
 control the plurality of pseudolites to broadcast satellite signals based on the determined satellite parameters, wherein the broadcasted satellite signals simulate locations of the plurality of satellites in orbit, wherein:
  the satellite ID corresponding with a satellite that has a longest time of usability for allocation with the pseudolite, and is in a setting position is placed at a highest priority of the schedule for allocation; and
  the satellite ID corresponding with a satellite that has a shortest time of usability for allocation with the pseudolite, and is in a rising position is placed at a least priority of the list for allocation.

10. The system of claim 9, wherein the system is further configured to determine the locations of the plurality of pseudolites based on relative range measurement.

11. The system of claim 10, wherein the system is further configured to:
 determine a location of a first set of plurality of pseudolites based on an allocation of at least one of the first set of plurality of pseudolites with the plurality of satellites;
 determine a range from the first set of plurality of pseudolites to a second set of plurality of pseudolites; and
 determine a location of additional plurality of pseudolites, based on the determined location of the at least three plurality of pseudolites.

12. The system of claim 1, wherein the system is further configured to:
 allocate each of the plurality of pseudolites with the list of the plurality of satellite IDs corresponding with a plurality of non-visible satellite, based on the schedule, upon the movement of the satellite out of the visible position;
 update the schedule of the plurality of satellites in orbit, upon a movement of the plurality of satellites into or out of a visible position for allocation with the pseudolite; and
 provide the updated schedule.

13. The system of claim 9, wherein the schedule is ordered by an amount of time a satellite is available for allocation with the pseudolite.

14. The system of claim 9, wherein each of the plurality of pseudolites is configured with samples vector derived based on the determined satellite parameters.

15. The system of claim 9, wherein the broadcasted satellites signal by are compliant with other signals broadcasted by the plurality of satellites in orbit.

* * * * *